United States Patent [19]

Macfarlane et al.

[11] Patent Number: 4,805,573
[45] Date of Patent: Feb. 21, 1989

[54] ENGINE WITH VARIABLE AREA INTAKE PASSAGES

[75] Inventors: Glen R. Macfarlane, Utica; Jordan R. Lee, Sterling Heights; Ross R. Smith, Taylor, all of Mich.

[73] Assignee: General Motors Corporation, Detroit, Mich.

[21] Appl. No.: 158,967

[22] Filed: Feb. 22, 1988

[51] Int. Cl.$^4$ .............................................. F02D 9/12
[52] U.S. Cl. .................................. 123/403; 123/52 M; 251/250; 251/319
[58] Field of Search ......... 123/52 M, 52 MB, 52 MV, 123/337, 402, 403, 405; 137/613; 251/250, 319, 356

[56] References Cited

U.S. PATENT DOCUMENTS

| | | |
|---|---|---|
| 3,557,762 | 1/1971 | Mitchell ................... 123/188 AF X |
| 3,875,918 | 4/1975 | Loynd . |
| 3,937,186 | 2/1976 | Stock et al. ..................... 123/403 X |
| 4,210,107 | 7/1980 | Shaffer ..................... 123/52 MB X |
| 4,228,772 | 10/1980 | Bakonyi ............................. 123/403 |

Primary Examiner—Tony M. Argenbright
Attorney, Agent, or Firm—Robert J. Outland

[57] ABSTRACT

An internal combustion engine or the like is provided with an induction system having intake runners of conical or equivalent configuration in which flow control cones or elements are axially moved to vary the effective cross-sectional area of the runner passages and thereby control the flow velocity and inertia of the incoming charge to improve various operating parameters such as combustion and charging efficiency.

12 Claims, 2 Drawing Sheets

ENGINE WITH VARIABLE AREA INTAKE PASSAGES

TECHNICAL FIELD

This invention relates to internal combustion engines and the like and, more particularly, to variable area induction system passages to intermittently feed intake charges to individual engine cylinders for combustion.

BACKGROUND

It is known in the art relating to internal combustion engines to provide one or more combustion chambers having inlet ports with openings for intermittently admitting to the chambers charges for combustion therein. In piston engines, the inlet ports commonly include inlet openings controlled by poppet valves and fed through inlet passages. These inlet passages may be defined as comprising the outer or lead-in portions of the cylinder intake ports and the connected runners of associated intake manifolds.

In connection with these arrangements, it has been previously recognized that a manifold or induction system designed for free breathing and good high speed performance is generally deficient in providing high engine torque at low speeds or efficient operation at part throttle and idle. A known method for improving this condition is to increase the flow velocity and inertia of the incoming air or air-fuel charge. This is sometimes attempted by providing dual manifold runners for each engine intake port, one runner having a relatively large cross section for free breathing at high speeds and loads and the other runner having a much smaller cross section to increase the flow velocity and inertia of the charge delivered to the intake ports. Another proposed solution is to provide the manifold runners with flexible walls to allow variation of their cross sections under differing operating conditions.

It is thought that the increased inertia resulting from utilizing intake passages or runners of smaller cross-sectional area during operation with reduced mass flow of the intake charges can result in increased cylinder turbulence and thereby improve combustion efficiency. The higher inertia may also improve volumeric efficiency by overcoming the back flow of a fresh intake charge when the piston begins its compression stroke and the intake valve is still open, a result which occurs predominatly at low engine speeds.

SUMMARY OF THE INVENTION

The present invention provides an engine with variable area intake passages. These are so arranged as to take full advantage of the higher charge inertia developed in low cross-sectional area passages at low engine speeds and gas flow conditions while allowing substantial increases in the cross-sectional area for free breathing and high performance at high engine speeds and load conditions where induction charge flow rates are sufficiently high.

The invention provides intake passages, including manifold runners and/or intake port sections, having surrounding wall portions with consistently converging inner surfaces. These include, for example, frusto-conical surfaces leading from the outer portions of the manifold to a point preferably close to the engine combustion chamber, or the associated intake valve if utilized. Flow control elements in the passages are also provided having outer surface portions which are generally parallel with and opposed to the converging inner surfaces of the intake passages. The elements are movable along the direction of fluid flow toward and away from the valve or port opening to vary the effective passage flow area and, thereby, the rate and inertia of fluid flow through the passages and into the intake port. Suitable means for actuating the flow control elements in unison so as to similarly control flow in the various intake passages are also provided.

These and other features and advantages of the invention will be more fully understood from the following description of certain specific embodiments of the invention take together with the accompanying drawings.

BRIEF DRAWING DESCRIPTION

DETAILED DESCRIPTION

Figure 1:
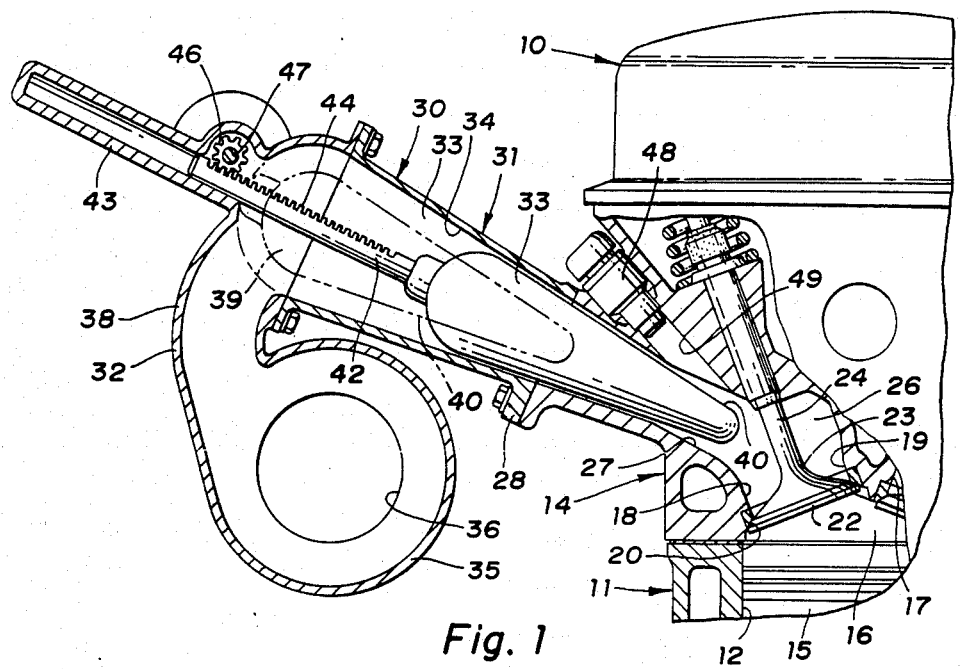
FIG. 1 is an end view of an internal combustion engine according to the invention having portions broken away to illustrate the cross-sectional configuration of the induction system having variable area intake passages and fuel injection means.

Referring now to the drawings in detail, numeral 10 generally indicates an internal combustion engine of the reciprocating piston type, although the present invention is not so limited. Engine 10 conventionally includes a cylinder block 11 including a plurality of cylinders 12, only one of which is shown. The cylinders are closed at one end by a cylinder head 14 which is carried by the block. Pistons 15 are reciprocably carried within the cylinders and cooperate with the block and the cylinder head to define variable volume working and combustion chambers 16 at the cylinder end.

The cylinder head 14 further includes exhaust and intake ports 17, 18 for each of the cylinders. The intake ports 18 include combustion chamber openings 19 which terminate in valve seats 20 on which are seatable the heads 22 of intake poppet valves 23. The valves 23 are carried in the cylinder head 14 and have stems 24 actuated in conventional manner through valve gear, not shown, to periodically admit intake charges to the associated combustion chambers.

The intake ports 18 further include delivery chambers 26 that surround the valve stems upstream of the openings 19 and port passages 27 that extend from a mounting surface 28 on the cylinder head side wall to their connection with respective delivery chambers 26 near one side of the associated valve stems 24.

The intake ports and valves form part of an engine cylinder charge induction system which further includes an intake manifold generally indicated by numeral 30. The manifold is, for convenience, made in two sections: a runner section 31 and a plenum and connector section 32.

The runner section 31 is mounted on the cylinder head mounting surface 28 and extends outwardly therefrom to define a plurality of runners 33, one for each intake port. These runners, as shown in FIG. 1, preferably join with the port passages 27 to define frusto-conical inner wall surfaces 34 extending from the far ends of the runner section into the port passages, to positions as close as possible to the associated valve stems.

The plenum and connector section 32 is mounted on the outer end of the runner section and includes an enlarged plenum 35 having an inlet 36 for connection with a filter or other source of clean air. The plenum connects through individual connecting legs 38 with the runners 33 of the runner section 31 so as to provide, in combination, a plenum type manifold with runners or intake passages, the engine connected portions of which are conical, convering in the direction of flow toward the engine. The lengths of the manifold passages from the plenum to the intake ports may be selected to provide tuning of the induction system for maximum power or efficiency.

To provide variation, in accordance with the invention, of the cross-sectional areas of the intake passages over an extended length immediately upstream of the intake valves, each of the conical intake passages is provided with a flow control element in the form of a movable cone 39. Each of the cones has frusto-conical outer surfaces 40 which are positioned generally parallel with and opposing the conically converging inner surfaces 34 of the induction system intake passages.

The cones 39 are supported on rods 42 that are carried in guides 43 in the connector section of the manifold. The rods preferably include rack teeth 44 which engage associated pinion gears 46 that are actuated together on a common shaft 47 to move the positions of the control elements, or cones 39, in unison between inner and outer locations. Alternatively, other suitable means could be provided for mounting and moving the cones.

In the inner location, shown in solid lines in FIG. 1, the effective cross-sectional flow areas of the intake passages are at a minimum. Further, the effective flow areas decrease from the large ends of the cones to their smaller ends, at the locations where the parallel tapered surfaces of the associated intake passages terminate, by reason of the decreasing diameters of the annular flow areas, which are, preferably, of constant radial thickness.

When the cones are in their outer positions, as shown in dashed lines in FIG. 1, the cross-sectional flow areas of the passages are at a maximum so as to allow free breathing during high speed and/or load operation of the engine.

In the embodiment of FIG. 1, fuel is provided to the intake charges through electronic fuel injectors 48 mounted in the cylinder head, or manifold if desired, and spraying through ducts 49 into their respective intake ports nesar the location of the valve stems and preferably directed at or near the valve heads. These multi-point fuel injectors may be connected and actuated in accordance with current fuel system technology.

Figure 2:
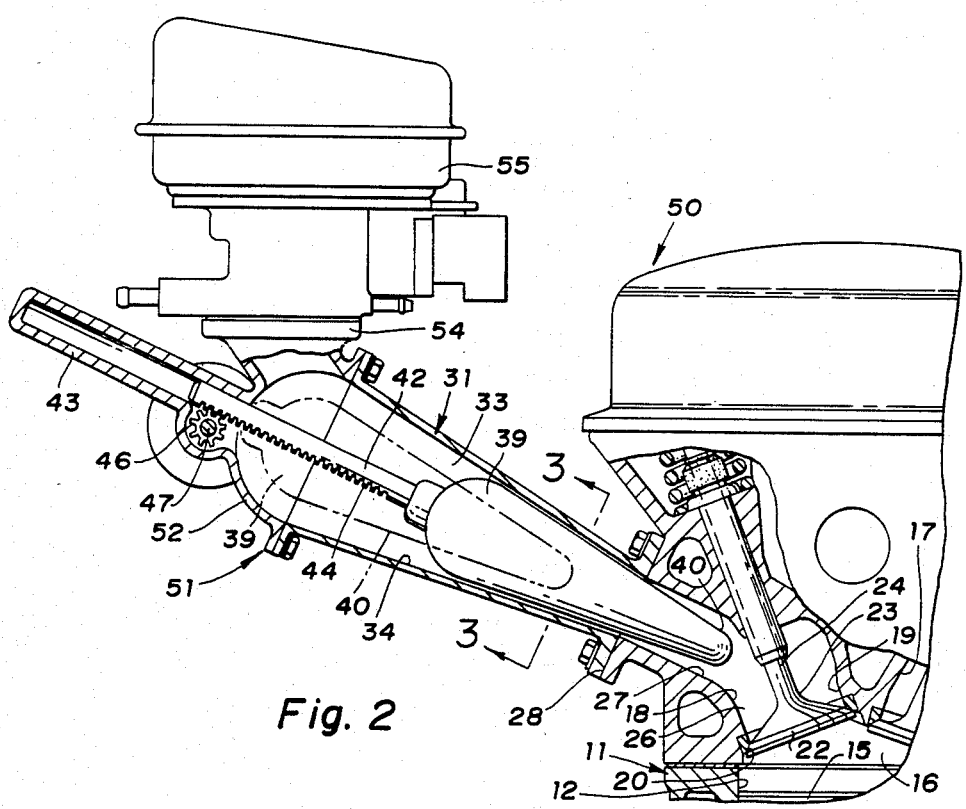
FIG. 2 is a view similar to FIG. 1 but showing an alternative embodiment of engine having an induction system fed by a unitized charge forming device, such as a carburetor.

The embodiment of FIG. 2 is fundamentally similar to that of FIG. 1, the engine 50 differing primarily in that the fuel injectors and ducts are omitted and the intake manifold 51 is modified. For simplicity, like numerals are used to identify like parts.

The modified intake manifold 51 has a runner section 31 which is fundamentally the same as that of the FIG. 1 embodiment, differing only as required to mount upon the cylinder head at a location closer to the valves, in view of the absence of injectors. Outward of the runner section 31, a log section 52 replaces the plenum and connector section of FIG. 1. Log section 52 extends longitudinally, connecting with each of the runners or passages 33 of the runner section 31. In addition, the log section 52 includes a flange 54 on which is mounted a carburetor 55, or an alternate charge forming device such as a throttle body injection unit. The log section also carries the pinion gears 46 and the rack toothed rods 42 of the cone-shaped control elements 39 as in the embodiment of FIG. 1.

In operation of either of the embodiments, fluid entering the manifold from the plenum intake or the carburetor is delivered to each of the cone shaped runners 33 upstream of the flow control cones 39. When the intake valve 24 of each cylinder is open, downward motion of the respective piston draws the charge of fluid through the respective manifold runner 33, passing through the variable conical annulus between the flow control cone 39 and the associated inner wall surfaces 34 of the manifold and/or the associated port passage 27.

In high speed and load operation of the engine, the cones 39 are positioned in or near their dashed line positions, which maximizes the annular thickness and the resulting effective cross-sectional passage area, to allow free passage of air or air-fuel mixture through the manifold and port into the engine cylinder. However, when the engine is operated at reduced speed and/or load with a reduced air flow requirement, the flow of mixture through the manifold is maintained at a high speed, or accelerated, by moving the flow control cones 39 toward the position shown in solid lines in FIGS. 1 and 2, thus reducing the effective flow area and increasing the flow velocity and inertia of the mixture or fluid passing through the manifold and into the intake port.

The flow control cones are designed such that, in their inner, low engine speed, positions, they extend beyond the end of the manifold and into the ports as close to the intake valves as possible. Accordingly, the acceleration of the mixture flow and the higher inertia obtained causes turbulence which preferably persists into the port and through the valve into the cylinder, providing improved operation at low speeds.

During low and mid speed engine operation, the increased turbulence is expected to result in improved charge mixing, increased combustion efficiency, reduced ignition delay, improved lean mixture operation and combustion stability, and increase combustion pressure rise. The increased charge inertia could also reduce exhaust backflow during valve overlap in low speed operation. The variable intake cross-sectional area may also be capable of providing variable tuning to meet different engine speed requirements.

While the configuration of the manifold passages and, optionally, the intake port passages may be frusto-conical, as shown in FIGS. 1 and 2, it should be recognized that other configurations for the intake passages and the associated flow control element may be utilized without departing from the concepts involved in the present invention.

Thus, for example, while the conical portions of the manifold runners and ports as illustrated are shown as arranged along a straight axis for linear movement of flow control element, it would also be possible to provide for curved passages and a similarly curved flow control element moved in arcuate fashion. The opposed surface portions of the flow control elements and their corresponding passages would still be arranged generally parallel with the opposed surfaces converging toward the engine so that variations in the passage flow areas would be similarly accomplished.

Figure 3:
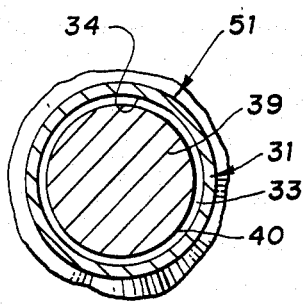
FIG. 3 is a cross-sectional view through one of the conical induction passages showing circular cross sections from the plane indicated by the line 3—3 of FIG. 2.

In like manner, the conical configurations of the control elements 39 and manifold runners 33 are shown in FIG. 3 to have circular cross sections. However, many other alternative cross-sectional configurations could be used.

Figure 4:
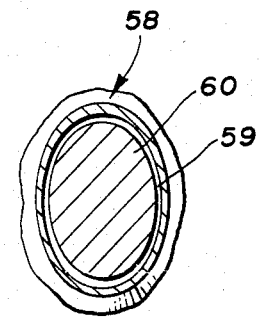
FIG. 4 is a cross-sectional view similar to FIG. 3 but showing an alternative embodiment of passage configuration wherein the cross sections are oval or elliptical in shape.
Figure 5:
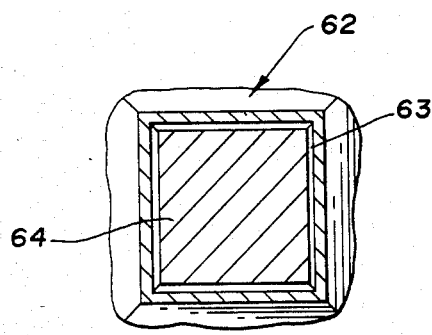
FIG. 5 is a cross-sectional view similar to FIG. 3 but showing an alternative embodiment wherein the induction passage cross secctions are rectangular and the passage form frustums of pyramids.

For example, in FIG. 4, an alternative manifold 58 is illustrated having oval runners 59 and control elements 60 of oval cross section. Similarly, in FIG. 5, there is illustrated a manifold 62 having runners 63 and flow control elements 64 of square or rectangular cross section wherein the opposing surfaces form frustums of pyramids.

Figure 6:
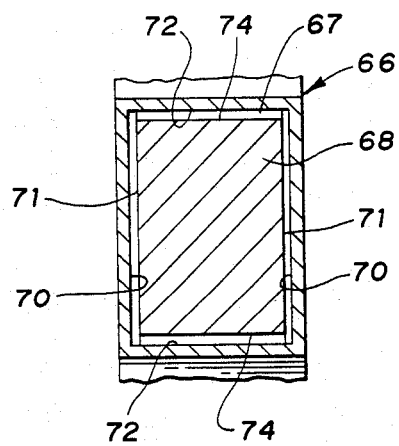
FIG. 6 is a view similar to FIG. 3 but showing an alternative embodiment wherein the passage cross sections are rectangular and the passages are wedge shaped.

Another alternative configuration is shown in FIG. 6 wherein a manifold 66 has runners 67 and flow control elements 68 of rectangular cross section. In this embodiment, the side surfaces 70, 71, as shown in the figure, of the runners and control elements are parallel to one another and only the upper and lower surfaces 72, 74 of the runners and elements converge in the direction of flow toward the cylinder. Thus, the inner surfaces of the runners and flow elements are wedge shaped.

These examples are but a few of the many possible arrangements for flow passages and control elements which might be utilized without departing from the spirit and scope of the present invention. In addition, it is recognized that applications of manifold and intake port induction systems disclosed herein could be made to rotary engines, or other machines utilizing intake ports with or without poppet or other intake valves. Since it is intended that the application of the invention not be limited to any one form of application, the term internal combustion engine or other similar terms which may be used in the specification and claims should be considered to include all forms of engines and other equivalent devices in which variable area intake runner and induction systems may be appropriately applied.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An internal combustion engine comprising, in combination,
   a cylinder intake port,
   means defining an intake passage having wall portions with consistently converging inner surfaces connecting with the intake port, and
   a flow control element in the passage and having outer surface portions generally parallel with and opposing the converging inner surfaces, the element being movable along the direction of fluid flow toward and away from the port to vary the flow area and thereby the velocity and inertia of fluid flow into the intake port.

2. An internal combustion engine comprising, in combination,
   a cylinder intake port having an opening controlled by a poppet valve,
   means defining an intake passage having wall portions with consistently converging inner surfaces connecting with the intake port upstream of the valve, and
   a flow control element in the passage and having outer surface portions generally parallel with and opposing the converging inner surfaces, the element being movable along the direction of fluid flow to and away from a point near the poppet valve to vary the flow area and thereby the velocity and inertia of fluid flow into the intake port.

3. An engine as in claim 2 wherein the opposing surfaces of the passage and the control element have circular lateral cross sections.

4. An engine as in claim 3 wherein the opposing surfaces of the passage and the control element are frusto-conical.

5. An engine as in claim 2 wherein the opposing surfaces of the passage and the control element have oval lateral cross sections.

6. An engine as in claim 2 wherein the opposing surfaces of the passage and the control element have rectangular lateral cross sections.

7. An engine as in claim 6 wherein the opposing surfaces of the passage and the control element define frustums of a pyramid.

8. An engine as in claim 6 wherein the opposing surfaces of the passage and the control element are wedge shaped.

9. An internal combustion engine comprising, in combination,
   a cylinder intake port,
   means defining an intake passage having wall portions with consistently converging inner surfaces connecting with the intake port,
   a flow control element in the passage and having outer surface portions generally parallel with and opposing the converging inner surfaces, the element being movable along the direction of fluid flow toward and away from the port to vary the flow area and thereby the velocity and inertia of fluid flow into the intake port, and
   means for moving the control element to control the fluid flow.

10. An internal combustion engine comprising, in combination,
    a plurality of cylinder intake ports,
    means defining intake passages having wall portions with consistently converging inner surfaces each connecting with at least one of the intake ports, and
    a flow control element in each passage and having outer surface portions generally parallel with and opposing the converging inner surfaces, each element being movable along the direction of fluid flow toward and away from its port to vary the flow area and thereby the velocity and inertia of fluid flow into the intake ports.

11. An engine as in claim 10 wherein the passage defining means includes an intake manifold.

12. An engine as in claim 11 wherein the intake manifold carries the flow control elements and further includes means for moving the control elements in unison to similarly control flow in the passages.

* * * * *